(12) United States Patent
Vichniakov

(10) Patent No.: US 9,963,218 B2
(45) Date of Patent: *May 8, 2018

(54) LIGHTWEIGHT STRUCTURAL PANEL

(71) Applicant: AIRBUS OPERATIONS GMBH, Hamburg (DE)

(72) Inventor: Alexei Vichniakov, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/136,455

(22) Filed: Apr. 22, 2016

(65) Prior Publication Data

US 2016/0311514 A1 Oct. 27, 2016

Related U.S. Application Data

(60) Division of application No. 13/345,182, filed on Jan. 6, 2012, now Pat. No. 9,347,221, which is a
(Continued)

(30) Foreign Application Priority Data

Jun. 6, 2006 (DE) ........................ 10 2006 026 167

(51) Int. Cl.
*B64C 1/12* (2006.01)
*E04C 2/20* (2006.01)
(Continued)

(52) U.S. Cl.
CPC ................ *B64C 1/12* (2013.01); *B64C 1/064* (2013.01); *E04C 2/08* (2013.01); *E04C 2/20* (2013.01);
(Continued)

(58) Field of Classification Search
CPC ..... E04C 2/38; E04C 2/20; E04C 2/28; E04C 2/08; B64C 1/12; B64C 2001/0072; B64C 1/064; Y10T 428/24174; Y02T 50/433
See application file for complete search history.

(56) References Cited

U.S. PATENT DOCUMENTS 2,912,724 A * 11/1959 Wilkes .................... B64C 1/066
181/207
4,109,435 A * 8/1978 Loyd ..................... B29C 65/562
156/92
(Continued)

FOREIGN PATENT DOCUMENTS

DE 196 39 667 C1 3/1998
DE 198 44 035 C1 11/1999
(Continued)

OTHER PUBLICATIONS

German Office Action (with English translation) for DE 10 2006 026 167.4 dated Mar. 15, 2007.
(Continued)

*Primary Examiner* — James M Ference
(74) *Attorney, Agent, or Firm* — Jenkins, Wilson, Taylor & Hunt, P.A.

(57) ABSTRACT

What is described is a lightweight structural panel which comprises a planarly extended outer skin of given thickness and stiffening elements which are connected to this outer skin and are arranged at a given distance from one another. According to the invention, the outer skin is formed by component layers which are each extended in the planar direction of the lightweight structural panel and complement one another in the direction of thickness to form the thickness of the outer skin and are interconnected, the stiffening elements being formed in one piece with one of the component layers.

12 Claims, 7 Drawing Sheets

Related U.S. Application Data continuation of application No. 11/810,549, filed on Jun. 6, 2007, now Pat. No. 8,096,092.

(51) Int. Cl.
  *E04C 2/38* (2006.01)
  *B64C 1/06* (2006.01)
  *E04C 2/08* (2006.01)
  *E04C 2/28* (2006.01)
  *B64C 1/00* (2006.01)

(52) U.S. Cl.
  CPC ............... *E04C 2/28* (2013.01); *E04C 2/38* (2013.01); *B64C 2001/0072* (2013.01); *Y02T 50/433* (2013.01); *Y10T 428/24174* (2015.01)

(56) References Cited

U.S. PATENT DOCUMENTS

| | | | | | |
|---|---|---|---|---|---|
| 4,223,503 | A | * | 9/1980 | Hague | E04D 3/38 52/394 |
| 4,331,495 | A | * | 5/1982 | Lackman | B29C 70/865 112/423 |
| 4,331,723 | A | * | 5/1982 | Hamm | B29C 70/865 156/293 |
| 4,749,155 | A | * | 6/1988 | Hammer | B64C 3/26 244/119 |
| 4,786,343 | A | * | 11/1988 | Hertzberg | B29C 65/48 112/423 |
| 4,811,540 | A | * | 3/1989 | Kallies | B29D 99/0014 244/123.3 |
| 4,908,254 | A | * | 3/1990 | Fischer | B64C 1/1461 244/119 |
| 4,966,802 | A | * | 10/1990 | Hertzberg | B29C 65/601 112/423 |
| 5,084,120 | A | * | 1/1992 | Fischer | B64C 1/1461 156/233 |
| 5,242,523 | A | * | 9/1993 | Willden | B29C 70/44 156/245 |
| 5,259,166 | A | * | 11/1993 | Carey, II | E03B 3/02 29/507 |
| 5,715,640 | A | * | 2/1998 | Haddock | E04D 13/10 52/25 |
| 5,735,486 | A | * | 4/1998 | Piening | B64C 3/20 244/124 |
| 5,811,035 | A | * | 9/1998 | Mockry | E04B 5/026 261/111 |
| 5,841,098 | A | * | 11/1998 | Gedrat | B23K 26/04 219/121.63 |
| 5,922,446 | A | * | 7/1999 | Piening | B64C 3/20 244/123.3 |
| 6,355,337 | B1 | * | 3/2002 | Piening | B29C 70/48 428/223 |
| 6,364,250 | B1 | * | 4/2002 | Brinck | B64C 1/12 244/119 |
| 6,419,146 | B1 | * | 7/2002 | Buldhaupt | B21D 26/055 228/157 |
| 6,543,721 | B2 | | 4/2003 | Palm | |
| 6,595,467 | B2 | | 7/2003 | Schmidt | |
| 6,620,484 | B1 | * | 9/2003 | Bolukbasi | B64C 1/062 244/119 |
| 6,766,984 | B1 | * | 7/2004 | Ochoa | B64C 1/12 244/119 |
| 6,775,951 | B2 | * | 8/2004 | Gumpert | E04D 3/28 52/200 |
| 7,074,474 | B2 | * | 7/2006 | Toi | B29C 70/443 244/119 |
| 7,138,028 | B2 | * | 11/2006 | Burpo | B29C 66/721 156/245 |
| 7,494,092 | B2 | * | 2/2009 | Brenner | B64C 1/12 244/119 |
| 7,530,531 | B2 | * | 5/2009 | Wood | B64C 1/1492 244/119 |
| 7,546,864 | B2 | * | 6/2009 | Kaye | B29C 70/30 156/461 |
| 8,096,092 | B2 | | 1/2012 | Vichniakov | |
| 9,347,221 | B2 | | 5/2016 | Vichniakov | |
| 2001/0015043 | A1 | * | 8/2001 | Brenneis | B64C 1/12 52/630 |
| 2001/0038057 | A1 | * | 11/2001 | Palm | B21C 23/142 244/119 |
| 2002/0000492 | A1 | * | 1/2002 | Schmidt | B23K 31/02 244/125 |
| 2002/0026756 | A1 | * | 3/2002 | Gumpert | E04D 3/28 52/200 |
| 2002/0031641 | A1 | * | 3/2002 | George | B32B 5/12 428/105 |
| 2002/0134889 | A1 | * | 9/2002 | Schmidt | B64C 3/182 244/133 |
| 2004/0035979 | A1 | * | 2/2004 | McCoskey, Jr. | B64C 3/26 244/117 R |
| 2004/0055248 | A1 | * | 3/2004 | Grillos | B64C 1/12 52/783.1 |
| 2005/0003145 | A1 | * | 1/2005 | Toi | B29C 70/443 428/102 |
| 2005/0077427 | A1 | * | 4/2005 | Brenner | B64C 1/12 244/117 R |
| 2005/0247818 | A1 | * | 11/2005 | Prichard | B64C 1/12 244/1 R |
| 2006/0060705 | A1 | * | 3/2006 | Stulc | B64C 1/069 244/119 |
| 2006/0156662 | A1 | * | 7/2006 | Vichniakov | B64C 1/06 52/309.17 |
| 2007/0277470 | A1 | * | 12/2007 | Vichniakov | B64C 1/12 52/588.1 |
| 2008/0000577 | A1 | * | 1/2008 | Vichniakov | B32B 1/00 156/182 |
| 2008/0296433 | A1 | * | 12/2008 | Brenner | B64C 1/12 244/129.1 |
| 2009/0263676 | A1 | * | 10/2009 | Litzenberger | B23K 1/16 428/626 |
| 2012/0102869 | A1 | | 5/2012 | Vichniakov | |

FOREIGN PATENT DOCUMENTS

| | | |
|---|---|---|
| DE | 199 24 909 C1 | 6/2000 |
| DE | 100 31 510 A1 | 1/2002 |
| DE | 101 63 848 A1 | 7/2003 |
| EP | 1 439 121 A1 | 7/2004 |

OTHER PUBLICATIONS

Non-Final Office Action for U.S. Appl. No. 11/810,549 dated Mar. 18, 2010.
Final Office Action for U.S. Appl. No. 11/810,549 dated Aug. 31, 2010.
Advisory Action for U.S. Appl. No. 11/810,549 dated Dec. 9, 2010.
Non-Final Office Action for U.S. Appl. No. 11/810,549 dated Mar. 2, 2011.
Notice of Allowance for U.S. Appl. No. 11/810,549 dated Sep. 15, 2011.
Restriction Requirement for U.S. Appl. No. 13/345,182 dated Jan. 17, 2013.
Non-Final Office Action for U.S. Appl. No. 13/345,182 dated Mar. 7, 2013.
Final Office Action for U.S. Appl. No. 13/345,182 dated Jul. 29, 2013.
Non-Final Office Action for U.S. Appl. No. 13/345,182 dated Nov. 14, 2013.
Final Office Action for U.S. Appl. No. 13/345,182 dated Mar. 12, 2014.
Non-Final Office Action for U.S. Appl. No. 13/345,182 dated Jul. 29, 2014.
Final Office Action for U.S. Appl. No. 13/345,182 dated Nov. 24, 2014.
Non-Final Office Action for U.S. Appl. No. 13/345,182 dated Mar. 12, 2015.

(56) References Cited

OTHER PUBLICATIONS

Final Office Action for U.S. Appl. No. 13/345,182 dated Aug. 11, 2015.
Advisory Action for U.S. Appl. No. 13/345,182 dated Dec. 22, 2015.
Notice of Allowance for U.S. Appl. No. 13/345,182 dated Jan. 21, 2016.

* cited by examiner

LIGHTWEIGHT STRUCTURAL PANEL

CROSS-REFERENCE TO RELATED APPLICATIONS

This application is a divisional of and claims priority to U.S. patent application Ser. No. 13/345,182 filed Jan. 6, 2012, which is a continuation of U.S. patent application Ser. No. 11/810,549, filed Jun. 6, 2007, which claims priority to German Patent Application No. 10 2006 026 167.4, filed Jun. 6, 2006. The entire disclosures of these applications are incorporated by reference herein.

FIELD OF THE INVENTION

The invention relates to a lightweight structural panel as is prescribed in the preamble of claim 1. Such a panel comprises a planarly extended outer skin of given thickness and stiffening elements connected to this outer skin and arranged at a predetermined distance from one another.

BACKGROUND ART

When designing lightweight structures, various strength, fatigue and damage tolerance requirements should be satisfied to suit the particular application. Particular importance is given to the damage-tolerant properties of lightweight structures in the field of aircraft construction in particular. It is known practice to produce lightweight structural panels by connecting stiffening profiles to a skin plate forming an outer skin.

It is known practice to provide stiffening elements in the case of lightweight structural panels, for instance on those which form the outer skin of an aircraft. These may, for example, extend in the manner of stringers in the longitudinal direction of the aircraft fuselage and have, for example, an inverted L-shaped cross section. It is conventional for such stiffening elements to be produced separately from the outer skin and then to be connected to the outer skin. At the foot of the stiffening element may be provided a leg which serves for fastening to the outer skin. The fastening can be achieved by riveting or adhesive bonding or by a combination thereof. Alternatively, the stiffening element can be welded at its foot end to the outer skin.

DE 196 39 667 and DE 198 44 035 disclose structural components in a welded skin/stringer construction. Profiles which can take the form of stringers or frames are welded by laser beam welding to large-sized skin sheets. DE 199 24 909 discloses the provision of a thickened formation in the foot region of a stiffening member provided on an outer skin so as to avoid or delay crack formations. The use of additional reinforcements on stiffening profiles is also disclosed in DE 101 63 848 and DE 100 31 510.

EP 1 439 121 A1 describes a lightweight structural component for aircraft in particular. The lightweight structural component is composed of at least one skin sheet and of stiffening elements arranged longitudinally or transversely, or longitudinally and transversely, thereon, these stiffening elements each being cohesively connected, either completely or at least partially, to the skin sheet by way of their foot, in which arrangement the web of the stiffening element is composed of two legs on its side facing the skin sheet and these legs are both cohesively connected to the skin sheet by means of two separate joint zones.

It is an object of the invention to provide a lightweight structural panel which combines low weight with high strength. In particular, the lightweight structural panel should be damage-tolerant and insensitive to crack formation as far as possible.

SUMMARY OF THE INVENTION

The object is achieved by a lightweight structural panel having the features of claim 1. Advantageous developments and configurations of the lightweight structural panel according to the invention are given in the subclaims.

The invention provides a lightweight structural panel which comprises a planarly extended outer skin of given thickness and stiffening elements which are connected to this outer skin and are arranged at a given distance from one another. According to the invention, the outer skin is formed by component layers which are each extended in the planar direction of the lightweight structural panel and complement one another in the direction of thickness to form the thickness of the outer skin and are interconnected, the stiffening elements being formed in one piece or integrally with one of the component layers.

According to a preferred embodiment of the lightweight structural panel according to the invention, the outer skin is formed by a first component layer and a second component layer, and the stiffening elements are formed in one piece or integrally with the second component layer.

According to one embodiment of the invention, the component layer with which the stiffening elements are formed in one piece or integrally is composed of a plurality of planar elements which are joined together in the planar direction.

The planar elements of the component layer with which the stiffening elements are formed in one piece or integrally may include one or more stiffening elements.

According to one embodiment of the invention, the stiffening elements are each formed by a plurality of component elements which are formed in one piece or integrally with various planar elements and interconnected.

According to one embodiment of the invention, the stiffening elements are each formed by two component elements, of which one is arranged on a first planar element and the other is arranged on a second planar element adjacent to the first, so that the stiffening elements are each formed by the component elements of the adjacent planar elements.

According to one embodiment of the invention, the stiffening element comprises a region, which is formed in one piece or integrally with the component layer or its planar elements, and a further region which is formed by one or more additional reinforcing elements which are connected to the region which is formed in one piece or integrally with the component layer or its planar elements.

According to one embodiment of the invention, the stiffening element comprises a web region arranged substantially perpendicularly to the planar direction of the outer skin and extending in a longitudinal direction along this outer skin, this web region being formed in one piece or integrally with the component layer or its planar elements.

The stiffening element may comprise a flange region extending substantially parallel to the planar direction of the outer skin.

According to one embodiment of the invention, the flange region is formed in one piece or integrally with the said web region.

According to one development of the invention, the stiffening element comprises one or more additional reinforcing elements which are not formed in one piece or in an integrated manner with the component layer or its planar elements.

According to one embodiment of the invention, the stiffening element has an inverted L-shaped or J-shaped cross section, of which the vertical leg forms the web region and the other leg forms the flange region.

The two component elements forming the stiffening element may have a same-direction inverted L- or J-shaped cross section and be tailored to one another such that they lie flat against one another and complement one another to form the stiffening element with the inverted L- or J-shaped cross section.

According to another embodiment of the invention, the stiffening element has a T-shaped cross section, of which the vertical leg forms the web region and the horizontal leg forms the flange region.

The two component elements forming the stiffening element may each have an opposite-direction inverted L- or J-shaped cross section and be tailored to one another such that they lie partially flat against one another and complement one another to form the T-shaped cross section of the stiffening element.

According to a further embodiment of the invention, the stiffening element has an I-shaped cross section.

The two component elements forming the stiffening element may each have an I-shaped cross section and be tailored to one another such that they lie flat against one another and complement one another to form the I-shaped cross section of the stiffening element.

Of the two component elements forming the stiffening element, one may have an I-shaped cross section and the other may have an inverted L-shaped cross section, the component element with the inverted L-shaped cross section being tailored to the component element with the I-shaped cross section such that it lies flat against the latter and the two component elements complement one another to form the I-shaped cross section of the stiffening element.

According to yet another exemplary embodiment of the invention, the stiffening element has a box-shaped cross section which results in the formation of two web regions and a flange region connecting these web regions.

If two component elements forming the stiffening element are provided, these may have an opposite-direction L- or J-shaped cross section and be tailored to one another such that they lie flat against one another in the flange region and complement one another to form the box-shaped cross section of the stiffening element.

According to one development of the invention, the component elements may form a Y-shaped transition region situated between the web region and the component layer.

An additional reinforcing element may be arranged between the web regions of the component elements forming the stiffening element.

An additional reinforcing element may be arranged on that side of the flange region of the stiffening element which is opposed to the web region, this reinforcing element running along the flange region and extending at least over the width thereof.

In this case, the additional reinforcing element may have an inverted U-shaped cross section and laterally overlap the flange region of the component elements of the stiffening element which are formed in one piece with the component layer and lie against this flange region.

In this case, a further reinforcing element which is strip-shaped may be arranged between the reinforcing element with the inverted U-shaped cross section and the flange region of the component elements of the stiffening element which are formed in one piece with the component layer.

According to another development of the invention, the component elements may have, between the web region and the component layer, an elbowed transition region with, as a result, a recessed, substantially rectangular cross section in which is arranged a further reinforcing element which is strip-shaped.

The stiffening element and the component layer with which the stiffening element is formed in one piece or integrally may be produced from a metal alloy.

The stiffening element and the component layer with which the stiffening element is formed in one piece or integrally may be produced from a fibre composite material.

The additional reinforcing elements may be produced from a metal alloy.

The additional reinforcing elements may be produced from a fibre composite material.

The component layers of the outer skin may be interconnected by adhesive bonding.

The component elements of the stiffening elements and the reinforcing elements may be interconnected by adhesive bonding.

BRIEF DESCRIPTION OF THE DRAWINGS

Exemplary embodiments of the invention will be explained below with reference to the drawing, in which.

DESCRIPTION OF PREFERRED
EMBODIMENTS OF THE INVENTION

Figure 1:
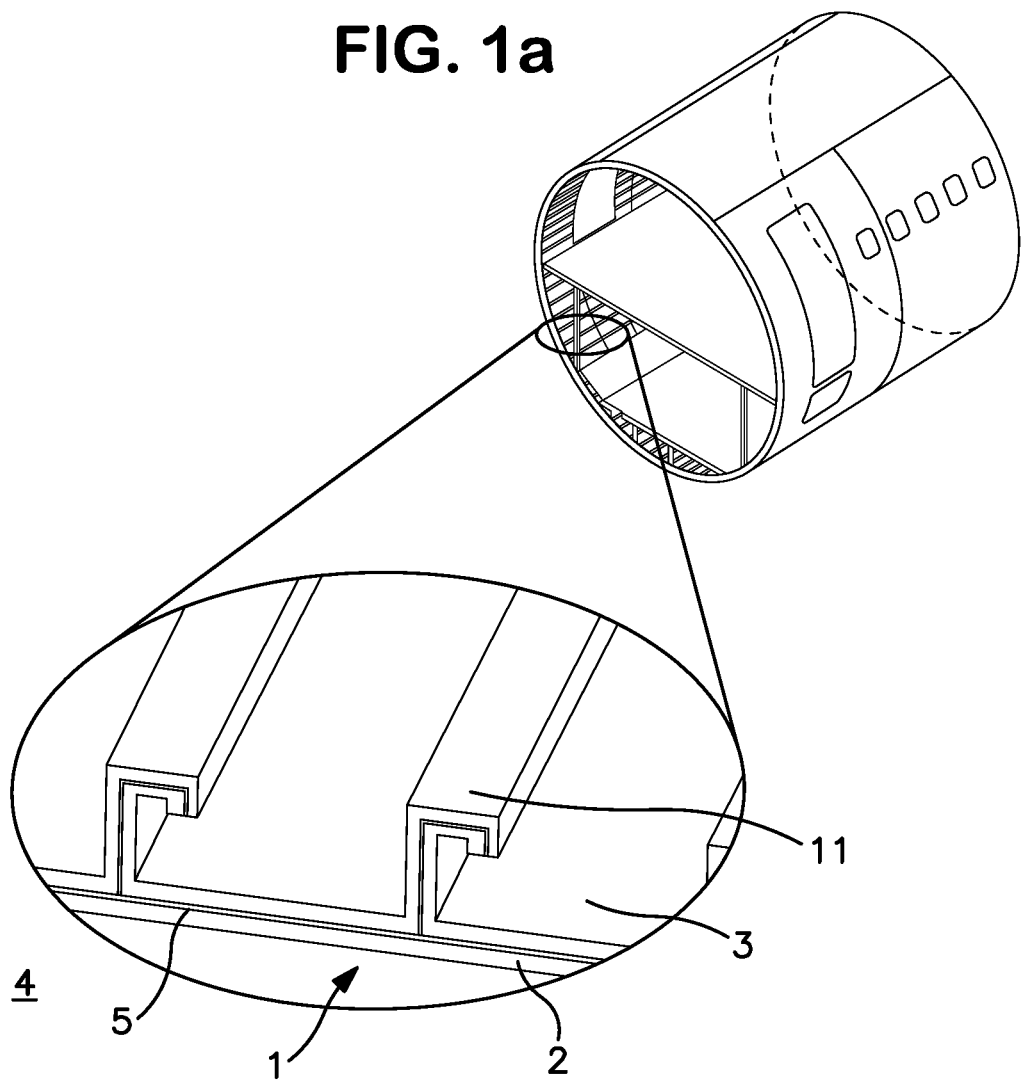
FIG. 1a) shows a schematic, perspective, sectional view of part of an aircraft fuselage in which an application can be found for a lightweight structural panel according to exemplary embodiments of the invention, and FIG. 1b) shows a perspective, sectional, enlarged view, through such a lightweight structural panel.

FIG. 1a) is a perspective, sectional and schematic representation showing part of an aircraft fuselage in which lightweight structural panels according to exemplary embodiments of the invention can find a use for the production of the outer skin.

FIG. 1b) is a somewhat schematic, enlarged, perspective and sectional representation showing part of such a lightweight structural panel which comprises a planarly extended outer skin 1 of given thickness and stiffening elements 11 connected to this outer skin and arranged at a given distance from one another. The outer skin 1 is formed by component layers 2, 3 which are each extended in the planar direction of the lightweight structural panel 4 and which complement one another in the direction of thickness to form the thickness of the outer skin 1. The component layers 2, 3 are interconnected flat, with this connection being produced by adhesive bonding using an adhesive layer 5 in the exemplary embodiment represented.

Stiffening elements 11 are provided on a side of the lightweight structural panel 4 that faces the inner side of the aircraft fuselage (cf. FIG. 1a)), these stiffening elements being formed integrally or in one piece with one of the two component layers 2, 3 of the outer skin 1, namely the inner component layer 3. In other words, the outer skin 1 is formed by a first component layer 2 and a second component layer 3, and the stiffening elements 11 are formed in one piece or integrally with the second component layer 3.

Figure 2:
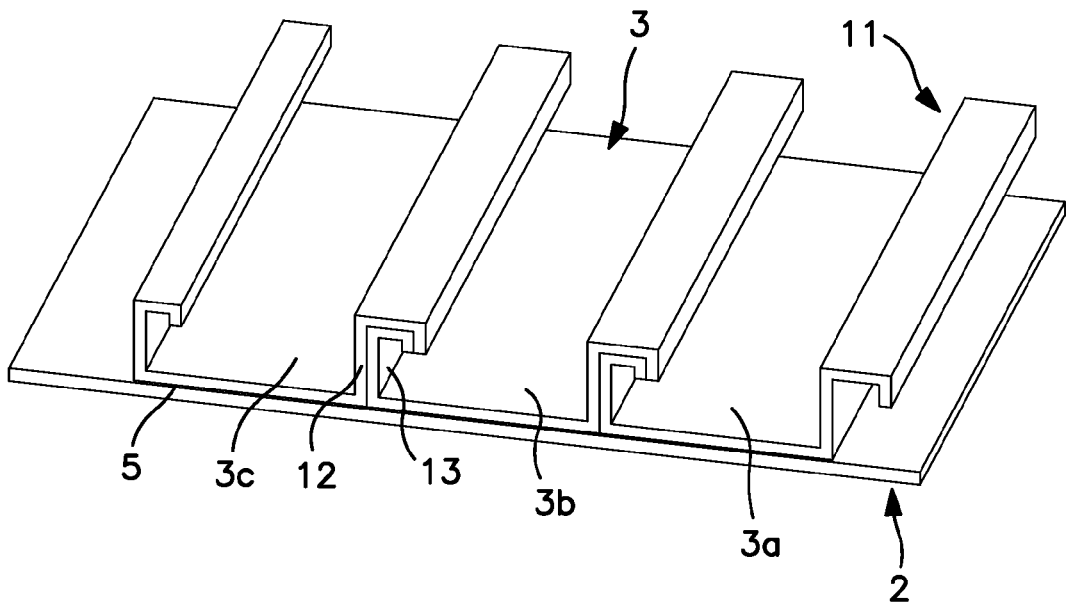
FIG. 2 shows a perspective, sectional view through a lightweight structural panel according to one exemplary embodiment of the invention.
Figure 3:
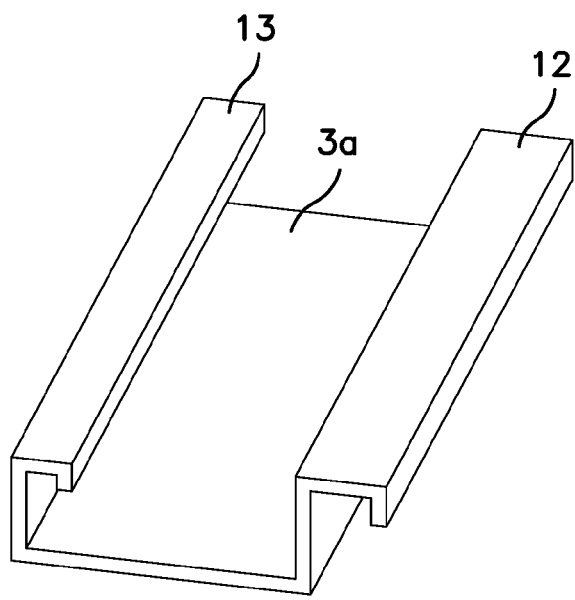
FIG. 3 shows a perspective, sectional view of a component layer of the lightweight structural panel shown in FIG. 2, this component layer having stiffening elements formed in one piece or integrally.
Figure 4:
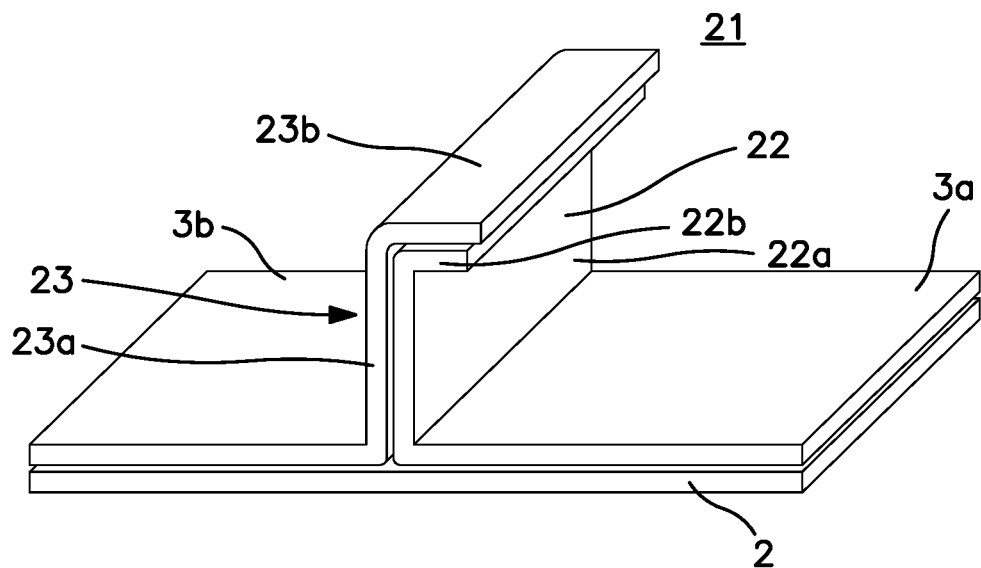
FIGS. 4 to 13 show enlarged, perspective, sectional views of details of lightweight structural panels according to various exemplary embodiments of the invention.
Figure 5:
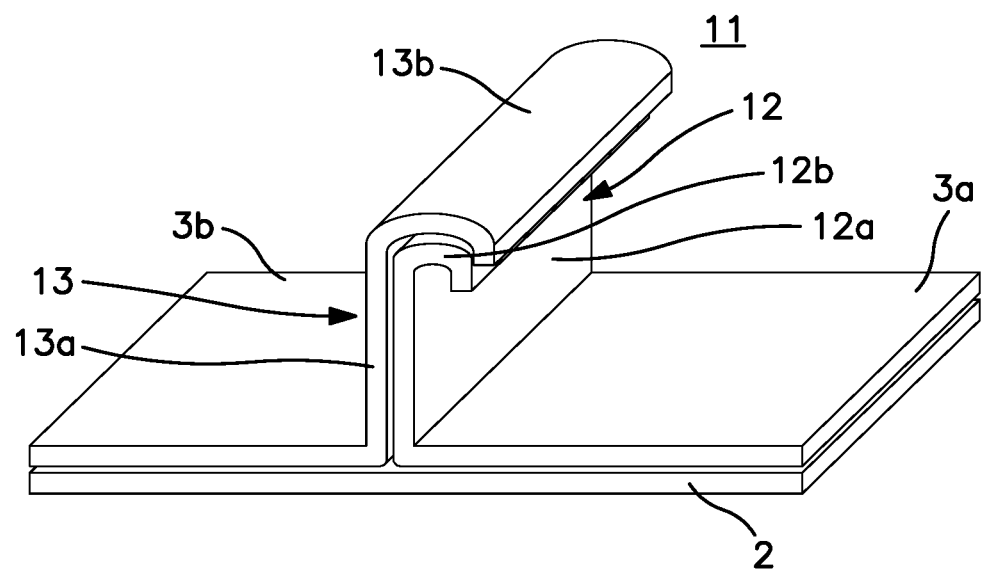
Figure 6:
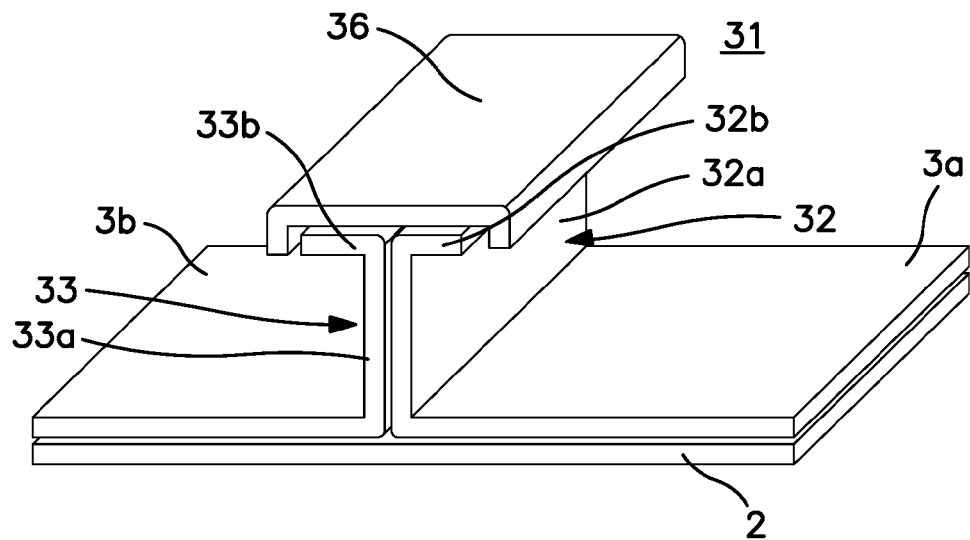

As FIG. 2 shows, in this exemplary embodiment the component layer 3 with which the stiffening elements 11 are formed in one piece or integrally is made up of a plurality of planar elements 3*a*, 3*b*, 3*c* which each spread from one stiffening element 11 to the next stiffening element 11 and are joined together in the planar direction, that is to say in the plane of the outer skin 1. The planar elements 3*a*, 3*b*, 3*c* of the component layer 3 with which the stiffening elements 11 are formed in one piece or integrally may each include one or more stiffening elements.

In the exemplary embodiment represented in FIG. 2, the stiffening elements 11 are each formed by two component elements 12, 13, of which one is arranged on one side of a first planar element 3*a* and the other is arranged on the other side of a second planar element 3*b* adjacent to the first, so that the stiffening elements 11 are each constituted by the two component elements 12, 13 of adjacent planar elements 3*a*, 3*b*. It is evident that the planar elements 3*a*, 3*b*, 3*c* are at least of substantially identical design; specifically, they each have a first component element 12 on one side and a second component element 13 on the other side, these first and second component elements 12, 13 together each producing a stiffening element 11. The component elements 12, 13 of the stiffening elements 11 are interconnected, in the exemplary embodiment shown, by an adhesive layer 5.

The various exemplary embodiments represented on an enlarged scale and in detail in FIGS. 4 to 13 resemble that shown in FIG. 2 to the extent that the outer skin 1 is formed by a first component layer 2 and a second component layer 3 and the stiffening elements 11; 21; 31; 41; 51 are formed in one piece or integrally with the second component layer 3. In these exemplary embodiments, the component layer 3 with which the stiffening elements 11; 21; 31; 41; 51 are formed in one piece is likewise composed of a plurality of planar elements 3*a*, 3*b* which are joined together in the planar direction, that is to say in the plane of the outer skin 1. The stiffening elements 11; 21; 31; 41; 51 are also each formed by two component elements 12; 22; 32; 42; 52 and 13; 23; 33; 43; 53, of which one is arranged on one side of one planar element 3*a* and the other is arranged on the other side of the other planar element 3*b* adjacent to the latter, so that the stiffening elements 11; 21; 31; 41; 51 are each formed by one component element 12; 22; 32; 42; 52 of one planar element 3*a* and the other component element 13; 23; 33; 43; 53 of the adjacent planar element 3*b*. However, it is also possible in other exemplary embodiments for the planar elements to have more than two stiffening elements.

In the exemplary embodiments which are shown in FIGS. 4, 5, 7, 8, 9 and 10, the stiffening elements 11; 21; 41; 51 are formed solely by the respective component elements 12, 13 and 22, 23 and 42, 43 and 52, 53 which are formed in one piece or integrally with the component layer 3.

By contrast, in the exemplary embodiments which are shown in FIGS. 6, 11, 12 and 13, the stiffening elements 31 are designed such that they comprise a region which is formed in one piece with the component layer 3 or its planar elements 3*a*, 3*b*, consisting of the first component elements 32 and the second component elements 33, and a further region, or further regions, which is or are formed by one or more additional reinforcing elements 36, 37, 38, 39 which are connected to the region 32, 33 which is formed in one piece with the component layer 3 or its planar elements 3*a*, 3*b*. The connection may again be in the form of adhesive layers, although these layers are not specifically represented in the figures.

In all the exemplary embodiments represented in FIGS. 2 to 13, the stiffening element 11; 21; 31; 41; 51 comprises a web region 12*a*, 13*a*; 22*a*, 23*a*; 32*a*, 33*a*; 42*a*, 43*a*; 52*a*, 53*a* which is arranged substantially perpendicularly to the planar direction of the outer skin 1 or its component layers 2, 3 and which extends in a longitudinal direction along the outer skin, this web region being formed by the respective component elements 12, 13; 22, 23; 32, 33; 42, 43; 52, 53 and being formed in one piece or integrally with the component layer 3 or its planar elements 3*a*, 3*b*, 3*c*.

Furthermore, the stiffening elements 11; 21; 31; 41; 51 of the exemplary embodiments represented in FIGS. 4, 5, 6 and 8 to 13 are designed such that they comprise a flange region 12*b*, 13*b*; 22*b*, 23*b*; 32*b*, 33*b*; 42*b*; 52*b*, 53*b* which extends substantially parallel to the planar direction of the outer skin 1 or its component layers 2, 3. This flange region is again provided on the respective component element 12, 13; 22, 23; 32, 33; 42; 52, 53 of the corresponding stiffening element 11; 21; 31; 41; 51 and formed in one piece or integrally with the corresponding web region 12*a*; 22*a*; 32*a*; 42*a*; 52*a* and 13*a*; 23*a*; 33*a*; 53*a* thereof.

In the exemplary embodiments represented in FIGS. 2, 4, 5 and 10, the stiffening element 11; 21 has an inverted L-shaped or J-shaped cross section, of which the vertical leg forms the web region 12*a*, 13*a*; 22*a*, 23*a* and the other leg forms the flange region 12*b*, 13*b*; 22*b*, 23*b* (these regions each being formed by the two component elements 12, 13; 22, 23). Here, the two component elements 12, 13; 22, 23 forming the stiffening element 11; 21 have a same-direction inverted L- or J-shaped cross section and are tailored to one another such that they lie flat against one another and complement one another to form the said inverted L- or J-shaped cross section of the stiffening element 11; 21.

In the exemplary embodiments of FIG. 6 and FIGS. 11 to 13, the stiffening element 31 generally has a T-shaped cross section, of which the vertical leg forms the web region 32*a*, 33*a* and the horizontal leg forms the flange region 32*b*, 33*b* (these regions each being formed by the two component elements 32, 33), resulting from the fact that the two component elements 32, 33 forming the stiffening element 31 have an opposite-direction inverted L- or J-shaped cross section and are tailored to one another such that they partially lie flat against one another and complement one another to form the said T-shaped cross section of the stiffening element 31.

Figure 7:
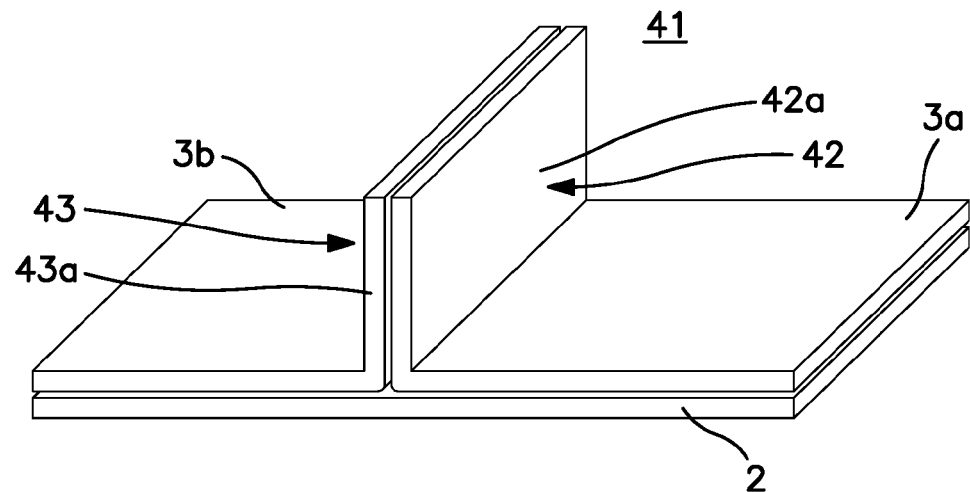
Figure 8:
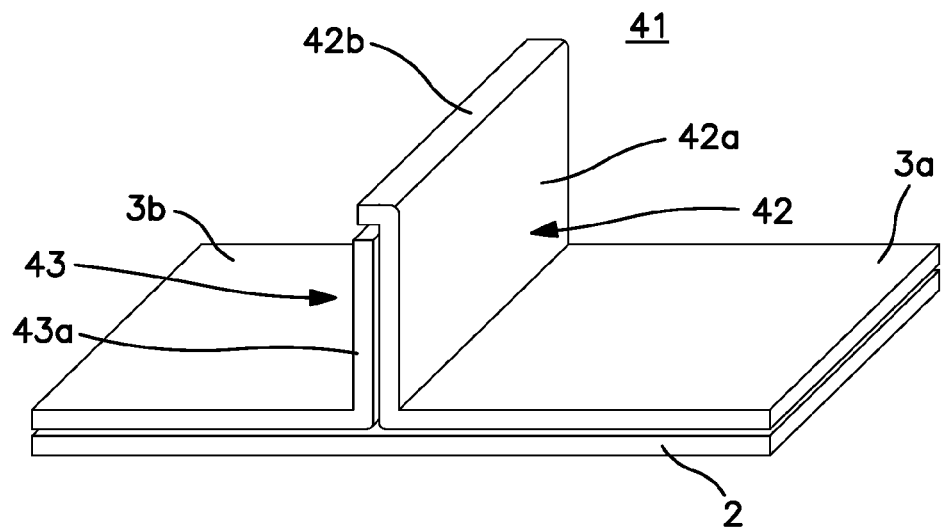

In the exemplary embodiments of FIGS. 7 and 8, the stiffening element 41 has an I-shaped cross section. In the case of the exemplary embodiment shown in FIG. 7, the two component elements 42, 43 forming the stiffening element 41 each have an I-shaped cross section and lie flat against one another such that they complement one another to form the said I-shaped cross section of the stiffening element 41. In the exemplary embodiment shown in FIG. 8, of the two component elements 42, 43 forming the stiffening element 41, one component element 43 has an I-shaped cross section and the other component element 42 has an inverted L-shaped cross section, the component element 42 with the inverted L-shaped cross section being tailored to the component element 43 with the I-shaped cross section such that it lies flat against the latter and such that the two component elements 42, 43 complement one another to form the said I-shaped cross section of the stiffening element 41.

Figure 9:
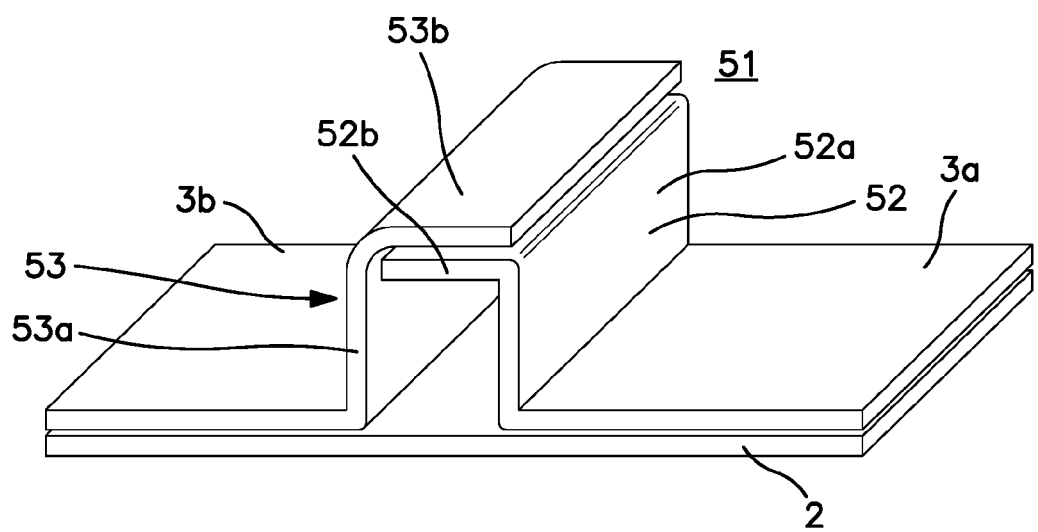

According to the exemplary embodiment represented in FIG. 9, the stiffening element 51 has a box-shaped cross section which forms two web regions 52a, 53a, which are perpendicular to the layers 2, 3 of the outer skin 1, and a flange region 52b, 53b connecting them which is parallel to the layers 2, 3 of the outer skin 1. The stiffening element 51 is formed by two component elements 52, 53 which have an opposite-direction inverted L-shaped cross section and are tailored to one another such that they lie flat against one another in the flange region 52b, 53b and complement one another to form the box-shaped cross section of the stiffening element 51.

Figure 10:
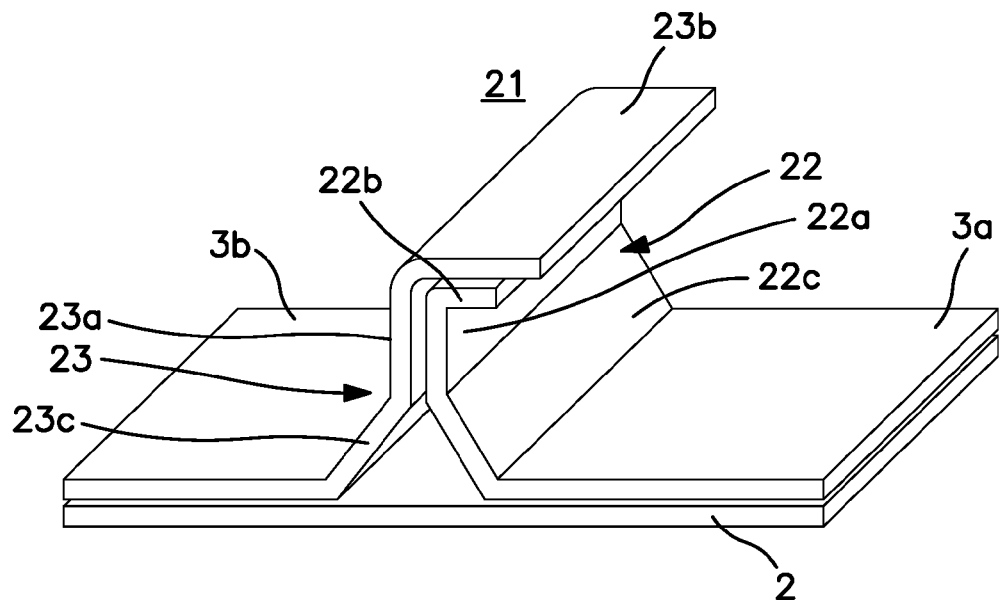

In the exemplary embodiment shown in FIG. 10, the component elements 22, 23 of the stiffening element 21 form, between their web regions 22a, 23a and the component layer 3a, 3b with which the component elements 22, 23 are formed in one piece or integrally, a Y-shaped transition region 22c, 23c which produces an additional reinforcement of the stiffening element 21.

Figure 11:
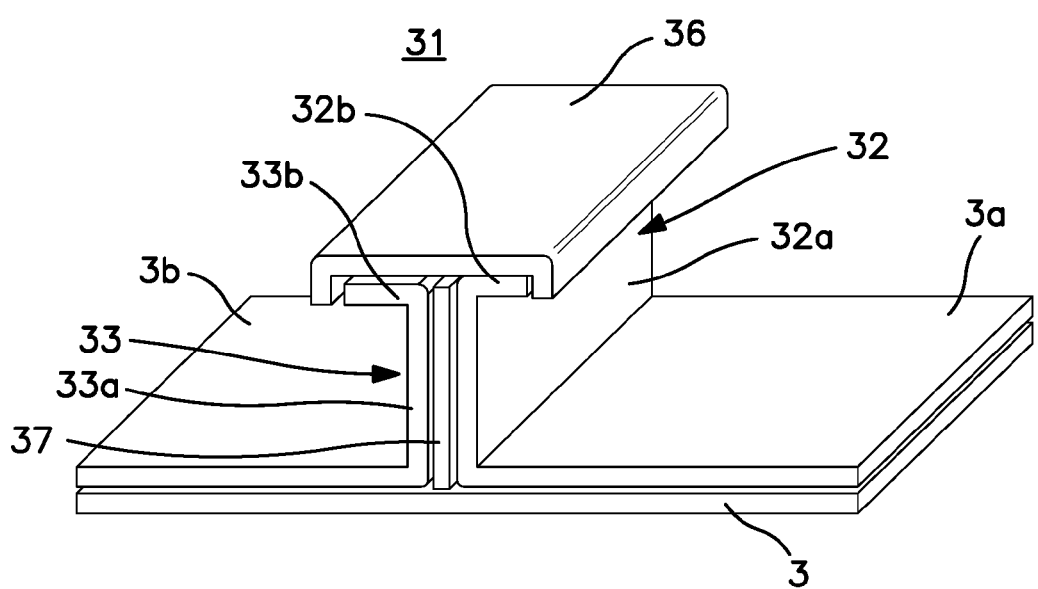

In the exemplary embodiment shown in FIG. 11, an additional reinforcing element 37 is arranged between the web regions 32a, 33a of the component elements 32, 33 forming the stiffening element 31.

Figure 12:
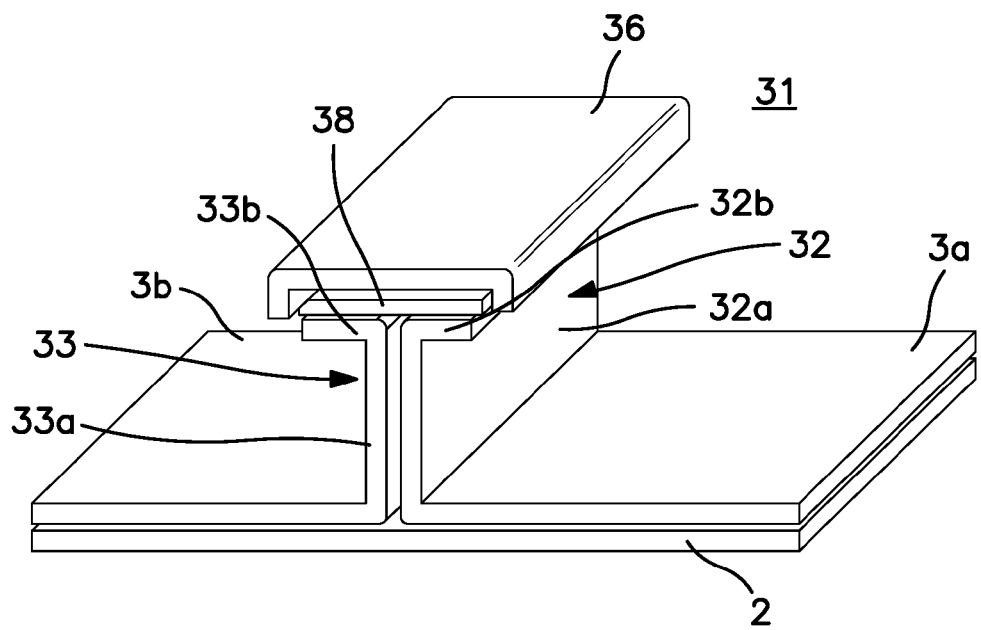
Figure 13:
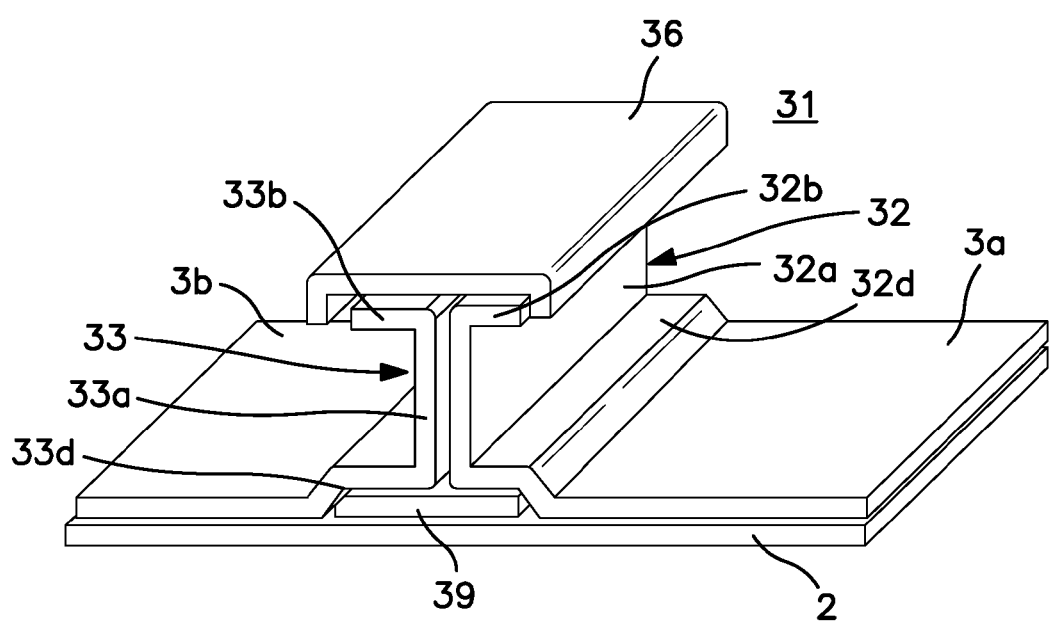

The exemplary embodiments of FIGS. 11 to 13 each comprise, on that side of the flange region 32b, 33b opposed to the component layer 3, 3a, 3b, an additional reinforcement element 36 which has an inverted U-shaped cross section and laterally overlaps the flange region 32b, 33b of the component elements 32, 33 formed in one piece with the component layer 3, 3a, 3b and lies against this flange region. In addition, in the exemplary embodiment shown in FIG. 12, a further reinforcing element 38 which is strip-shaped in form is arranged between this reinforcing element 36 with the inverted U-shaped cross section and the flange region 32b, 33b of the component elements 32, 33.

The stiffening element 31 of the exemplary embodiment represented in FIG. 13 has component elements 32, 33 which, between their web region 32a, 33a and the component layer 3a, 3b with which they are formed in one piece or integrally, form an elbowed transition region 32d, 33d with, as a result, a recessed, substantially rectangular cross section in which a further reinforcing element 39 which is strip-shaped is arranged.

The stiffening element 11; 21; 31; 41; 51 of all the exemplary embodiments and the component layer 3, 3a, 3b, 3c with which it is formed in one piece or integrally may be produced from a metal alloy or may be produced from a fibre composite material. The additional reinforcing elements 36, 37, 38, 39 may be produced from the same material or from a different one; for example, a metal alloy for the additional reinforcing elements 36, 37, 38, 39 may be combined with a fibre composite material for the parts of the stiffening element 11; 21; 31; 41; 51 which are formed in one piece or integrally with the component layer 3, 3a, 3b, 3c, or vice versa. As has already been described further above, the component layers 2, 3 of the outer skin 1 can be interconnected by adhesive bonding, as can the component elements and reinforcing elements.

The stiffening elements 11; 21; 31; 41; 51 may be formed by component elements or be formed in one piece. With a one-piece formation, the component elements 12, 13; 22, 23; 32, 33; 42, 43 and 52, 53, which are represented separately in the figures, are formed integrally as one component. In that case, the connecting surface between planar elements bearing adjacent stiffening elements is in the skin plate, or in the second component layer 3 with which the stiffening elements 11; 21; 31; 41; 51 are integrally formed.

LIST OF REFERENCE NUMERALS

1 Outer skin
2 First component layer
3 Second component layer
3a, 3b, 3c Planar element
4 Lightweight structural panel
5 Adhesive layer
11; 21; 31; 41; 51 Stiffening element
12; 22; 32; 42; 52 Component element
13; 23; 33; 43; 53 Component element
12a; 22a; 32a; 42a; 52a Web region
13a; 23a; 33a; 43a; 53a Web region
12b; 22b; 32b; 42b; 52b Flange region
13b; 23b; 33b; 53b Flange region
32c, 33c Transition region
32d, 33d Transition region
36 Reinforcing element
37; 38; 39 Reinforcing element
71; 81 Stiffening element

What is claimed is:

1. A lightweight structural panel, comprising:
a planarly extending outer skin having a predetermined thickness, the outer skin being formed by a plurality of component layers each extended in a planar direction of the lightweight structural panel and complementing one another in a direction of the thickness to form a thickness of the outer skin and the component layers being interconnected; and
stiffening elements connected to the outer skin and arranged at a predetermined distance from one another, the stiffening elements being formed together in one piece,
wherein each stiffening element comprises:
a plurality of component elements formed integrally as one component;
a region formed in one piece with a first component layer of the plurality of component layers or with planar elements of the first component layer;
a connecting surface between adjacent planar elements, the surface bearing adjacent component elements of the plurality of component elements situated in a plane of the outer skin or in a second component layer of the plurality of component layers, the connecting surface being integrally formed with the adjacent component elements; and
a further region formed integrally with the first component layer or with the planar elements of the first component layer,
wherein the region formed in one piece with the first component layer or with the planar elements of the first component layer is produced from a combination of a metal alloy and a fiber composite material.

2. The lightweight structural panel according to claim 1, wherein each stiffening element comprises a flange region extending substantially parallel to a planar direction of the outer skin,
the flange region being formed in one piece or integrally with a web region, and
wherein each stiffening element comprises one or more additional reinforcing elements which are not formed in one piece or integrally with the first component layer or with planar elements of the first component layer.

3. The lightweight structural panel according to claim 2, wherein each stiffening element has a T-shaped cross section, of which a vertical leg forms the web region and a horizontal leg forms the flange region.

4. The lightweight structural panel according to claim 2, wherein the one or more additional reinforcing elements are produced from a metal alloy.

5. The lightweight structural panel according to claim 2, wherein the one or more additional reinforcing elements are produced from a fiber composite material.

6. The lightweight structural panel according to claim 2, wherein the component elements and the one or more reinforcing elements are interconnected by adhesive bonding.

7. The lightweight structural panel according to claim 1, wherein the plurality of component elements forming the stiffening elements each have an opposite-direction inverted L-shaped or J-shaped cross section and are tailored to one another such that the plurality of component elements lie partially flat against one another and complement one another to form a T-shaped cross section of each stiffening element.

8. The lightweight structural panel according to claim 1, wherein each stiffening element has an I-shaped cross section.

9. A lightweight structural panel, comprising:
a planarly extending outer skin having a predetermined thickness, the outer skin being formed by a plurality of component layers comprising at least one inner component layer and a metal alloy;
the plurality of component layers each extending in a planar direction of the lightweight structural panel and complementing one another in a direction of the thickness to form the thickness of the outer skin, the component layers being interconnected;
wherein the inner component layer comprises a plurality of planar elements, at least two of the plurality of planar elements being positioned adjacent to one another;
wherein each of the plurality of planar elements comprises two component elements arranged on one side of each of the plurality of planar elements; and
wherein corresponding component elements of component elements of adjacent planar elements form a plurality of stiffening elements, the plurality of stiffening elements being connected to the outer skin and being arranged at a predetermined distance from one another, the plurality of stiffening elements being formed in one piece;
wherein at least one of the plurality of stiffening elements comprises a web region arranged substantially perpendicularly to a planar direction of the outer skin and extending in a longitudinal direction along the outer skin, the web region being formed in one piece with planar elements of the inner component layer;
wherein at least one of the plurality of stiffening elements comprises a flange region extending substantially parallel to the planar direction of the outer skin, the flange region being formed integrally with the web region;
wherein at least one of the plurality of stiffening elements comprises a connecting surface between the planar elements, the surface bearing adjacent component elements situated in a plane of the outer skin or in a second component layer of the plurality of component layers, the connecting surface being integrally formed with the adjacent component elements; and
wherein at least one of the plurality of stiffening elements has an inverted J shaped cross section or box-shaped cross section, of which a vertical leg forms the web region and another leg forms the flange region.

10. The lightweight structural panel according to claim 9, wherein at least one of the plurality of stiffening elements comprises two component elements, one of the component elements being formed in one piece or integrally with a first planar element, and another of the plurality of stiffening elements being formed in one piece or integrally with a second planar element adjacent to the first planar element, so that the at least one of the plurality of stiffening elements and the another of the plurality of stiffening elements are each formed by the adjacent planar elements.

11. The lightweight structural panel according to claim 9, wherein at least one of the plurality of stiffening elements comprises the web region arranged substantially perpendicular to the planar direction of the outer skin and extending in a longitudinal direction along the outer skin, the web region being formed in one piece with the inner component layer or with the planar elements of the inner component layer.

12. The lightweight structural panel according to claim 9, wherein at least one of the plurality of stiffening elements comprises a flange region extending substantially parallel to the planar direction of the outer skin.

* * * * *